United States Patent [19]

Sampson et al.

[11] 3,892,714

[45] July 1, 1975

[54] HYDROXY COPOLYMER REACTED WITH A LACTONE AND POLYISOCYANATE CROSSLINKED

[75] Inventors: Keith George Sampson, Clophill; Victor Frederick Jenkins, St. Albans; Anthony John Bunker, Kempston, all of England

[73] Assignee: Laporte Industries Limited, London, England

[22] Filed: Dec. 4, 1972

[21] Appl. No.: 311,502

[30] Foreign Application Priority Data
Dec. 9, 1971    United Kingdom............... 57175/71

[52] U.S. Cl..................... 260/77.5 CR; 260/42.52; 260/77.5 AN; 260/859 R; 260/884; 260/88 S
[51] Int. Cl............................................. C08g 22/16
[58] Field of Search........ 260/859 R, 901, 77.5 AN, 260/77.5 CR, 885

[56]    References Cited
UNITED STATES PATENTS
3,760,034    9/1973    Critchfield et al................. 260/901

FOREIGN PATENTS OR APPLICATIONS
859,642    1/1961    United Kingdom
1,201,909    8/1970    United Kingdom
1,257,638    12/1971    United Kingdom Primary Examiner—Murray Tillman
Assistant Examiner—J. Ziegler
Attorney, Agent, or Firm—Larson, Taylor and Hinds

[57]    ABSTRACT

A polymeric composition comprising main chains, side chains attached thereto and crosslinking units between side chains. The main chains comprise a copolymer of two or more ethylenically unsaturated monomers at least one of which contains hydroxyl groups, the side chains comprise lactone chains attached to said hydroxyl groups and the crosslinking units comprise polyisocyanates. The copolymers may be prepared and subsequently modified or the side chain may be attached to an ethylenically unsaturated monomer and the modified copolymer prepared directly by polymerisation with other unsaturated monomers. The modified copolymers are crosslinked and cured with a polyisocyanate.

7 Claims, No Drawings

3,892,714

HYDROXY COPOLYMER REACTED WITH A LACTONE AND POLYISOCYANATE CROSSLINKED

The present invention relates to a process for producing polymeric compositions and to polymeric compositions.

Some of the polymeric compositions with which the present invention is concerned are especially suitable for use as coating compositions.

According to the present invention there is provided a polymeric composition comprising;
a. main chains comprising a copolymer of two or more ethylenically unsaturated monomers at least one of which contains an hydroxyl group,
b. side chains, attached to at least some of the hydroxyl groups of the copolymer, comprising lactone chains, and
c. linking units comprising polyisocyanate, which crosslink at least some of the side chains.

The polymeric compositions of the present invention have a particularly desirable combination of flexibility, hardness and good chemical durability. The structure of the polymeric composition is novel in that it comprises the copolymer chains crosslinked by a polyisocyanate which is attached to lactone chains. It is believed that the lactone chains provide the required flexibility whilst themselves being protected from attack by chemicals by virtue of their position between the polyisocyanate and the copolymer chain.

According to another aspect of the present invention there is provided a process for the preparation of a polymeric composition which comprises crosslinking a modified copolymer with a polyisocyanate wherein the modified copolymer comprises a copolymer of two or more ethylenically unsaturated monomers at least one of which contains an hydroxyl group, modified by the presence of lactone chains attached to at least some of the hydroxyl groups of the copolymer.

The modified copolymer may be prepared by the process described in British Pat. No. 1,257,638 wherein a lactone is first reacted in the presence of an acidic catalyst with an hydroxyl containing ethylenically unsaturated monomer and then the unsaturated product copolymerised with another unsaturated monomer.

According to a further aspect of the present invention there is provided a process for the preparation of a modified copolymer which comprises:
a. reacting an ethylenically unsaturated hydroxyl-containing monomer with one or more ethylenically unsaturated monomers to form a copolymer containing hydroxyl side groups, and
b. modifying this copolymer by reacting at least some of the hydroxyl side groups with a lactone.

The modified copolymer may be useful in making coating compositions by reaction with amino resins and this use is exemplified in our copending application Ser. No. 311,503 of even date.

Preferably the unmodified copolymer has an hydroxyl value of at least 20 mg KOH/g but preferably less than 250mg KOH/g. Particularly preferably the hydroxyl value of the copolymer is from 30 to 100.

The present invention also provides according to a further aspect a process for the preparation of a polymeric composition which comprises:

a. reacting an ethylenically unsaturated hydroxyl-containing monomer with one or more ethylenically unsaturated monomers to form a copolymer containing hydroxyl side groups,
b. reacting at least some of the said hydroxyl side groups with a lactone to form a modified copolymer containing hydroxyl terminated side groups and
c. reacting the modified copolymer with a polyisocyanate.

The ethylenically unsaturated monomer containing an hydroxyl group may be an unsaturated alcohol such as allyl alcohol, an alkylol acrylamide or methacrylamide such as methylol acrylamide or methylol methacrylamide or an unsaturated hydroxyalkyl ester. Preferably the hydroxyl-containing unsaturated monomer is an ethylenically unsaturated hydroxyalkyl ester. It is advantageous if the hydroxyl groups form part of — $CH_2OH$ groups and particularly advantageous if there is only one hydroxyl group per molecule.

Preferably the ethylenically unsaturated hydroxyalkyl ester referred to in the present invention has the general formula $CH_2 = CR_1 — COOR_2$ wherein $R_1$ is hydrogen or an alkyl group and the group $R_2$ is an alkyl group to which one or more hydroxyl groups are attached. Preferably the group $R_1$ is hydrogen or a methyl group. Preferred esters include 2-hydroxy-ethyl acrylate, 2-hydroxy-ethyl methacrylate and 2-hydroxy-propyl methacrylate; a particularly preferred ester is 2-hydroxy-ethyl acrylate.

Preferably the or each ethylenically unsaturated monomer has the part formula $CH_2=C<$ so that it may be readily polymerised and it is advantageously a vinyl, alkyl methacrylate or acrylate monomer. It is advantageous if the or each of the ethylenically unsaturated monomers have no hydroxyl groups.

Examples of useful monomers having this part formula are styrene, vinyl toluene, methyl methacrylate, vinyl acetate and butyl methacrylate. Preferred monomers are styrene, vinyl toluene and methyl methacrylate, particularly preferred is styrene.

Conveniently the reaction between the ethylenically unsaturated monomer or monomers is conducted in a solvent which is advantageously a substantially water-free solvent at a temperature of from 20° to 200°C, preferably at a temperature in the range of from 50° to 180°C. The solvent used in this solution reaction should preferably not contain hydroxyl groups. If the solvent does contain hydroxyl groups the hydroxyl groups must be removed, preferably by removing the solvent itself, before contact with the lactone. A particularly useful solvent is xylene.

It has been found advantageous in the polymerisation to use an initiator suitable for vinyl polymerisation. Preferably such an initiator is an azo catalyst, an organic peroxygen compound such as t-butyl peracetate, an organic peroxide such as benzoxyl peroxide or an organic hydroperoxide such as t-butyl hydroperoxide. An azo catalyst which is particularly preferred in the present invention is 2,2' azo bis-2-methyl propionitrile.

Normally control of the molecular weight of the copolymer produced by this reaction is required and to obtain such control conveniently it is advantageous to add a chain transfer agent. The use of these agents is well known in the art, and it is equally known that by varying the amount of chain transfer agent added it is possible to exert considerable control over the molecular weight of the copolymer produced. Useful and convenient chain transfer agents are carbon tetrachloride and the mercaptans.

The mode of addition of the ethylenically unsaturated monomers, solvent if used, initiator if used and chain transfer reagent if used, controls the precise product obtained. In certain embodiments of the present invention it may be convenient or desirable to begin the polymerisation by initiating a small amount, for example, less than 20 mol % of the reactants and then to add further reactants with a chain transfer agent if required and optionally, further initiator. Where it is desired to produce a uniform copolymer, the molar ratio of hydroxyl-containing monomer to other monomer is desirably kept constant during their reaction.

The reaction between one or more of the hydroxyl groups on the copolymer with the lactone will result in opening of the lactone ring in the normal manner to produce a hydroxyl terminated lactone chain. A hydroxyl terminated lactone chain may react with further lactone molecules to produce a hydroxyl terminated polylactone side chain. Reference herein to a lactone chain means an hydroxyl terminated side chain of this sort whether it contains one or more lactone derived units. Thus in adding the lactone to the polymer it is desirable to calculate beforehand the amount of the lactone needed to give the average side chain length required. Generally it is found that the side chain length may be increased indefinitely, that is that large amounts of lactone may be used. Also it seems likely, although this theory is not essential to exercise the invention, that many hydroxyl side chains are added on to, that is, that the lactone added does not polymerise on to a few hydroxyl groups to produce several long polylactone chains but that the lactone molecules are distributed among a large number of hydroxyl side chains. Further it has been found that over a wide range of average side chain lengths the coating compositions made from a particularly modified copolymer have a flexibility which increases with the average length of the said chain in the modified polymer. The flexibility of the coating compositions however depends not only on the average length of the side chain but also on the number of side chains there are. In the present invention the amount of lactone added (expressed as a weight percentage of the unmodified copolymer) is normally from 10 to 60%.

The term "lactone" as used herein is defined as one or more compounds each of formula:

(1) 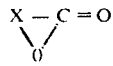

wherein X is a —$(CR_2)_n$— group, wherein n is an integer of from 4 to 7 and wherein each of the 8 to 14 groups R is any group selected from hydrogen, methyl, ethyl, n-propyl, isopropyl, chlorine and bromine provided that the total number of carbon atoms in the —$(CR_2)_n$— group does not exceed 12 and provided that there are no more than 2 halogen atoms in the —$(CR_2)_n$— group. Desirably n is 5 that is the lactone is an epsilon-caprolactone and particularly preferably the lactone is epsilon-caprolactone. Other preferred epsilon-caprolactones are a methyl epsilon-caprolactone, a mixture of isomeric methyl caprolactones or a mixture of isomeric methyl epsilon-caprolactones with epsilon-caprolactone.

In order to effect reaction of the lactone with the side chain it is advantageous to use a catalyst and to heat the mixture comprising lactone, catalyst, and copolymer preferably under reflux in a solvent. The solvent may be the same as was used in the reaction to form the copolymer or it may be a different solvent but it must contain no hydroxyl groups. The copolymer may be prepared just before adding the lactone and it may be reacted with the lactone without removing the solvent in which it was prepared provided that solvent does not contain any hydroxyl groups. Organo-tin compounds are particularly preferred catalysts for the reaction of the lactone with the copolymer and an especially preferred catalyst is dibutyl tin dilaurate. There are other known catalysts for the reaction such as alkyl titanates, organo-zirconium compounds and organic acids. The reaction temperature of the mixture is suitably from 20° to 220°C and preferably from 120° to 200°C. Refluxing at 120° to 200°C is normally continued for from 6 to 24 hours or for such time as is necessary.

The mixing of the modified polymer and the polyisocyanate is normally carried out in an inert solvent, or a mixture of inert solvents such as xylene and/or cellulose acetate butyrate which should not contain —OH—SH—$NH_2$ or similar active hydrogen groups. The mixing is normally carried out at ambient temperature although it may be carried out at elevated temperatures. A catalyst may be added to the mixture, for example organo-tin or organo-zinc compound; a preferred catalyst is dibutyl tin dilaurate.

The term polyisocyanate is used to mean a compound having two or more isocyanate groups and is preferably a di-isocyanate. The di-isocyanate is particularly preferably an aliphatic or cycloaliphatic di-isocyanate. Examples of suitable di-isocyanates are 4,4' methylene bis (cyclohexyl isocyanate) and 2,2',4 trimethylhexamethylene di-isocyanate. Diphenyl methane di-isocyanate may also be used but its use may lead to difficulties in applying the coating composition to substrates. Preferably the amount of polyisocyanate which is incorporated in the modified polymer to produce the polymeric composition is from 10 to 70% by weight of the modified polymer.

In those embodiments of the invention in which the polymeric composition is to be used as a coating composition the polyisocyanate and the modified polymer are preferably thoroughly mixed before applying them in a suitable manner to the surface to be coated. Preferably the mixture is applied as a liquid to the surface by any convenient means and it is then normally dried. The reaction may then be completed by a curing step. The curing step preferably comprises cold curing which is conveniently carried out at ambient temperatures.

The coating compositions based on the polymeric composition of the present invention are suitable in such diverse fields as motor cars and kitchen furniture. The polymeric composition may be applied as a coating composition by any suitable method such as brushing, spraying, roller coating and the like. In its preparation pigments, dyes and/or thickeners may be added in order that the polymeric composition may be particularly suited to a specific coating use.

Should it be desired that the polymeric compositions, as described herein, contain one or more dyes, pigments or thickeners they are added before curing and

EXAMPLE 1 – Relating to the Production of a Copolymer

Styrene (31.2g 0.3 moles), 2-hydroxyethyl acrylate (3.48g 0.03 moles) and dry xylene (150g) were introduced into a glass reaction vessel equipped with stirrer, thermometer, reflux condenser, nitrogen inlet, reagent inlets and a water trap on the condenser outlet to maintain a nitrogen atmosphere.

The reaction vessel, which was provided with a nitrogen atmosphere throughout the reaction was heated to reflux the mixture at a temperature of about 130°C. 2,2' azo bis-2-methyl propionitrile (0.711g) was added to the reaction vessel to initiate the polymerisation. The remainder of the bulked monomers, styrene (280.8g 2.67 moles) 2-hydroxyethyl acrylate (31.32g, 0.27 moles) together with carbon tetrachloride (7 mls, 0.068 moles) 2,2' azo bis-2-methyl propionitrile (0.711g) and dry xylene (204.3g) were pumped into the reaction vessel over a period of 5½ hours. After 6 hours the reaction was recatalysed with 2,2' azo bis-2-methyl propionitrile (0.35g) in dry xylene (12.9g).

After this further addition of reagents the reaction was continued at reflux for a further 14 hours. The product solution obtained after dilution to 40% w/w of resin with xylene was a clear slightly yellow liquid of viscosity 0.23 Ns/m$^2$ (P.R.S. Bubble Viscometer) indicating an average M.W. of about 25,000. OH value of the solid product was 44.6 mg KOH/g.

EXAMPLE 2 — Relating to the Production of a Copolymer

This example is identical to Example 1, except that there is no addition of carbon tetrachloride to the reaction mixture. The product solution obtained after dilution to 40% w/w of resin with xylene was a clear slightly yellow liquid of viscosity 0.4 Ns/m$^2$ (P.R.S. Bubble Viscometer) indicating an average M.W. of about 50,000. OH value of the solid product was 46.0 mg KOH/g.

EXAMPLE 3 — Relating to the Production of a Modified Copolymer 96.5g of the product solution from Example 1 and xylene (10g) were heated to boiling, then ε-caprolactone (10.72g) and dibutyl tin dilaurate (0.055g) were added. The reaction mixture was refluxed for 22 hours. OH value of the solid product was 46.0 mg KOH g$^{-1}$.

EXAMPLE 4 — Relating to the Production of a Modified Copolymer 150g of the product solution from Example 1 and xylene (15g) were heated to boiling, then ε-caprolactone (21.75g) and dibutyl tin dilaurate (0.06g) were added. The reaction mixture was refluxed for 19 hours at 144°C. OH value of the solid product was 44.6 mg KOH g$^{-1}$.

EXAMPLE 5 — Relating to the Production of a Modified Copolymer 150g of the product solution from Example 2 and xylene (10g) were brought to boiling under nitrogen, then ε-caprolactone (7.17g) and dibutyl tin dilaurate (0.06g) were added. The reaction mixture was refluxed for 11½ hours. OH value of the product was 41.2 mg KOH/g.

EXAMPLE 6 — Relating to the Production of a Modified Copolymer 150g of the product solution from Example 2 and xylene (10g) were brought to boiling under nitrogen, then ε-caprolactone (21.5g) and dibutyl tin dilaurate (0.06g) were added. The reaction mixture was refluxed for 17 hours. OH value of the product was 3.6 mg KOH g$^{-1}$.

EXAMPLE 7 — Relating to the Production of a Pigmented Polymeric Composition

Acrylic resin (100g) prepared as in Example 1 was ball-milled with rutile titanium dioxide pigment (40.8g sold by Laporte Industries Ltd. as RH 472, dried in an oven at 100°C for 48 hours prior to use) and dry xylene (55g) until dispersion was achieved as measured by a fineness of grind gauge (Sheen Instruments Ltd.) of 0.0005 inch (7 Hegman Scale).

Pigmented resin solution (20.0g) prepared as above was mixed with diphenyl methane di-isocyanate (0.489g). This gives an OH to NCO ratio of 1:1.

The paint formulation was applied as a wet film to degreased glass, steel (Gold Seal, Bonderite treated, Pyrene Co. Ltd.) and aluminium (BA 99% half hard, Blackburns (London) Ltd.) plates using a 0.003 inch doctor blade. The plates were allowed to cure at 25°C in air of relative humidity 55%.

EXAMPLE 8 — Relating to the Production of a Pigmented Polymeric Composition

Pigmented resin solution (20g) prepared as in Example 7 was mixed with 4,4' methylene bis (cyclohexyl isocyanate) (0.512g). This gives an OH to NCO ratio of 1:1.

The paint formulation was applied and cured as in Example 7.

EXAMPLE 9 — Relating to the Production of a Pigmented Polymeric Composition

Pigmented resin solution (20g) prepared as in Example 7 was mixed with 2,2',4, trimethyl hexamethylene di-isocyanate (0.410g). This gives an OH to NCO ratio of 1:1.

The paint formulation was applied and cured as in Example 7.

EXAMPLE 10 — Relating to the Production of a Pigmented Polymeric Composition

Acrylic resin (50g) prepared as in Example 2 was ball-milled with rutile titanium dioxide pigment (172g sold by Laporte Industries Ltd. as RH 472, dried in an oven at 100°C for 48 hours prior to use) until dispersion was achieved as measured by a fineness of grind gauge (Sheen Instruments Ltd.) of 0.0005 inch (7 Hegman Scale).

Pigmented resin solution (15g) prepared as above, was mixed with 4,4' methylene bis (cyclohexyl isocyanate) (0.81g). This gives an OH to NCO ratio of 1:1.

The paint formulation was applied and cured as in Example 7.

EXAMPLE 11 — Relating to the Production of a Pigmented Polymeric Composition Pigmented resin solution (15g) prepared as in Example 10 was mixed with 2,2,4 trimethyl hexamethylene di-isocyanate (0.65g). This gives an OH to NCO ratio of 1:1.

The paint formulation was applied and cured as in Example 7.

EXAMPLE 12 — Relating to the Production of a Pigmented Polymeric composition Modified resin (50g) prepared as in Example 3 was ball-milled with rutile titanium dioxide pigment (20.8g sold by Laporte Industries Ltd. as RH 472, dried in an oven at 100°C for 48 hours prior to use) and dry xylene (25g) until dispersion was achieved as measured by a fineness of grind gauge (Sheen Instruments Ltd.) of 0.0005 inch (7 Hegman Scale).

Pigmented resin solution (20g) prepared as above was mixed with diphenyl methane di-isocyanate (0.535g). This gives an OH to NCO ratio of 1:1.

The paint formulation was applied and cured as in Example 7.

EXAMPLE 13 — Relating to the Production of a Pigmented Polymeric Composition Pigmented resin solution (20g) prepared as in Example 12 was mixed with 4,4' methylene bis (cyclohexyl isocyanate) (0.560g). This gives an Oh to NCO ratio of 1:1.

The paint formulation was applied and cured as in Example 7.

EXAMPLE 14 — Relating to the Production of a Pigmented Polymeric Composition Pigmented resin solution (20g) prepared as in Example 12 was mixed with 2,2,4, trimethyl hexamethylene di-isocyanate (0.949g). This gives an OH to NCO ratio of 1:1.

The paint formulation was applied and cured as in Example 7.

EXAMPLE 15 — Relating to the Production of a Pigmented Polymeric Composition Modified resin (50g) prepared as in Example 4 was ball-milled with rutile titanium dioxide pigment (20.0g sold by Laporte Industries Ltd. as RH 472, dried in an oven at 100°C for 48 hours prior to use) until dispersion was achieved as measured by a fineness of grind gauge (Sheen Instruments Ltd.) of 0.0005 inch (7 Hegman Scale).

Pigmented resin solution (20g) prepared as above was mixed with diphenyl methane di-isocyanate (0.613g). This gives an OH to NCO ratio of 1:1.

The paint formulation was applied and cured as in Example 7.

EXAMPLE 16 — Relating to the production of a Pigmented Polymeric Composition Pigmented resin solution (20g) prepared as in Example 15 was mixed with 4,4' methylene bis (cyclohexyl isocyanate) (0.642g). This gives an OH to NCO ratio of 1:1.

The paint formulation was applied and cured as in Example 7.

EXAMPLE 17 — Relating to the Production of Pigmented Polymeric Compositions

Pigmented resin solution (20g) prepared as in Example 15 was mixed with 2,2,4, trimethyl hexamethylene diisocyanate (0.514g). This gives an OH to NCO ratio of 1:1.

The paint formulation was applied and cured as in Example 7.

EXAMPLE 18 — Relating to the Production of Pigmented Polymeric Compositions

Modified resin (50g) prepared as in Example 5 was ball-milled with rutile titanium dioxide pigment (17.2g sold by Laporte Industries Ltd. as RH 472, dried in an oven at 100°C for 48 hours prior to use) until dispersion was achieved as measured by a fineness of grind gauge (Sheen Instruments Ltd.) of 0.0005 inch (7 Hegman Scale).

Pigmented resin solution (20g) prepared as above was mixed with 4,4' methylene bis (cyclohexyl isocyanate) (0.72g). This gives an OH to NCO ratio of 1:1.

The paint formulation was applied and cured as in Example 7.

EXAMPLE 19 — Relating to the Production of Pigmented Polymeric Compositions

Pigmented resin solution (15g) prepared as in Example 18 was mixed with 2,2,4, trimethyl hexamethylene di-isocyanate (0.58g). This gives an OH to NCO ratio of 1:1.

The paint formulation was applied and cured as in Example 7.

EXAMPLE 20 — Relating to the Production of Pigmented Polymeric Compositions

Modified resin solution (50g) prepared as in Example 6 was ball-milled with rutile titanium dioxide pigment (20g sold by Laporte Industries Ltd. as RH 472, dried in an oven at 100°C for 48 hours prior to use) until dispersion was achieved as measured by a fineness of grind gauge (Sheen Instruments Ltd.) of 0.0005 inch (7 Hegman Scale).

Pigmented resin solution (20g) prepared as above was mixed with 4,4' methylene bis (cyclohexyl isocyanate) (0.881g). This gives an OH to NCO ratio of 1:1.

The paint formulation was applied and cured as in Example 7.

EXAMPLE 21 — Relating to the Production of Pigmented Polymeric Compositions

Pigmented resin solution (15g) prepared as in Example 20 was mixed with 2,2',4, trimethyl hexamethylene di-isocyanate (0.53g). This gives an OH to NCO ratio of 1:1.

The paint formulation was applied and cured as in Example 7.

EXAMPLE 22 — Relating to the Testing of Pigmented Polymeric Compositions

The three finishes from Examples 7, 12, 15 were tested with a falling weight impact tester machine described in BS 1,391. The reverse impact required to cause 50% of the panels to fail by cracking of the paint film was recorded as the impact strength.

The finishes were also subjected to the mandrel bend test for flexibility and adhesion to the base material according to BS 256. The hardness of the films were also determined by the Rocker Hardness apparatus and the results expressed as a percentage of the hardness of a standard glass surface. These results and those for reverse impact are given in Table 1.

lowed to stabilise at room temperature for 2 hours, then were examined visually and given a rating on a scale such that 10 = completely unaffected
0 = completely destroyed Table 3

| Example | % by weight of ε-caprolactone in modified resin. | 5% Acetic Acid | 5% Caustic Soda | Petrol | Water 100°C | 2% Tide Soln. 70°C | Hydraulic Fluid at 25°C |
|---------|---|---|---|---|---|---|---|
| 8 | 0 | 10 | 4 | 0 | 9 | 10 | 3 |
| 13 | 10 | 10 | 5 | 8 | 9 | 10 | 7 |
| 16 | 25 | 10 | 10 | 7 | 10 | 10 | 10 |

Table 1

| Example | % by weight of ε-caprolactone in modified resin | Bend | Hardness | Impact |
|---------|---|---|---|---|
| 7 | 0 | >¾" | 52% | 50"lbs |
| 12 | 10 | ½"–¾" | 58% | 50"lbs |
| 15 | 25 | <1/16" | 30% | 160"lbs |

EXAMPLE 23 — Relating to the Testing of Pigmented Polymeric Compositions

The finishes from Examples 10, 18, 20 were subjected to the same tests as described in Example 22. The results are given in Table 2.

Table 2

| Example | % by weight of ε-caprolactone in modified resin | Bend | Hardness | Impact |
|---------|---|---|---|---|
| 10 | 0 | >¾" | 41% | 8"lbs |
| 18 | 10 | 1/16"–⅛" | 57½% | 8"lbs |
| 20 | 25 | <1/16" | 32% | >160"lbs |

EXAMPLE 24 — Relating to the Testing of Pigmented Polymeric Compositions

The following tests were carried out on the stoved finishes from Examples 8, 13, 16 and the results given in Table 3.

a. Resistance to acetic acid was measured by immersion in 5% by weight aqueous acetic acid solution at 25°C for 24 hours.
b. Resistance to alkali was measured by immersion in 5% by weight aqueous sodium hydroxide solution at 25°C for 100 hours.
c. Resistance to petrol was measured by immersion in a commercial motor fuel of octane rating 97 at 25°C for 24 hours.
d. Hydrolysis resistance was measured by immersion in boiling dimineralised water for 24 hours.
e. Resistance to detergent was measured by immersion in 2% by weight aqueous "Tide" (Proctor and Gamble Ltd.) at 70°C for 24 hours.
f. Resistance to hydraulic fluid ("Girling Crimson," Castrol Ltd., London) by immersion for 24 hours at 25°C.

All the tests being carried out on films spread on steel panels as described in Example 7.

After the respective test cycle the plates were al-

We claim:
1. A polymeric composition comprising:
   a. from 5% to 85% by weight, main chains comprising a copolymer of at least two ethylenically unsaturated monomers at least one of which is an ethylenically unsaturated hydroxy alkyl ester having the formula $CH_2 = CR_1 - COOR_2$ in which $R_1$ is hydrogen or an alkyl group and $R_2$ is an alkyl group to which at least one methylol group is attached
   b. from 5 to 85% by weight, side chains comprising chains derived from an epsilon caprolactone attached to oxygen remnants of hydroxyl groups on said copolymer and
   c. from 10% to 40% by weight linking chains comprising di-isocyanate which cross-link said side chains.

2. A polymeric composition as claimed in claim 1 wherein at least one of the ethylenically unsaturated monomers is selected from the group consisting of styrene, vinyl toluene and methyl methacrylate.

3. A process for the preparation of a polymeric composition comprising:
   a. reacting an ethylenically unsaturated hydroxy alkyl ester monomer having the formula $CH_2 = CR_1 - COOR_2$ in which $R_1$ is hydrogen or an alkyl group and $R_2$ is an alkyl group to which at least one methylol group is attached with at least one ethylenically unsaturated monomer to form a copolymer containing hydroxyl side groups,
   b. modifying said copolymer by reacting it with from 10 to 60% by weight of an epsilon caprolactone at a temperature of about 20° to about 220°C, and
   c. cross-linking said modified copolymer with from 10 to 70% by weight of di-isocyanate.

4. A process as claimed in claim 3 wherein the ethylenically unsaturated hydroxyalkyl ester is selected from the group consisting of 2-hydroxyethyl acrylate, 2-hydroxyethyl methacrylate and 2-hydroxypropyl methacrylate.

5. A process as claimed in claim 3 wherein at least one ethylenically unsaturated monomer is selected from the group consisting of styrene, vinyl toluene and methyl methacrylate.

6. A process as claimed in claim 3 wherein the reaction of the modified copolymer and the di-isocyanate is carried out in the presence of a hydroxyl-free solvent.

7. A process as claimed in claim 3 wherein the reaction of the modified copolymer and the di-isocyanate is completed by cold curing.

* * * * *